United States Patent [19]

Sutherland

[11] Patent Number: 5,500,753
[45] Date of Patent: Mar. 19, 1996

[54] METHOD AND SYSTEM FOR CONNECTING AN OPTICAL NETWORK UNIT WITH A PLURALITY OF USER SITES

[75] Inventor: Joseph E. Sutherland, Raleigh, N.C.

[73] Assignee: Alcatel Network Systems, Inc., Richardson, Tex.

[21] Appl. No.: 122,712

[22] Filed: Sep. 14, 1993

[51] Int. Cl.⁶ .......................... H04B 10/08; H04B 3/38; H04M 3/00
[52] U.S. Cl. ................ 359/125; 359/110; 340/825.01; 340/826; 379/306; 379/335
[58] Field of Search ................... 359/125, 110, 359/127, 137, 124, 109; 340/825.01, 826, 827, 825.79, 825.85; 385/17; 370/110.1, 13, 58.1, 16; 379/335, 306, 27, 29, 30, 279, 292, 307

[56] References Cited

U.S. PATENT DOCUMENTS

| | | | |
|---|---|---|---|
| 4,360,809 | 11/1982 | Bourgonje | 379/306 |
| 4,833,708 | 5/1989 | Goodrich | 379/335 |
| 4,907,253 | 3/1990 | Watrous | 379/335 |
| 5,150,355 | 9/1992 | Dyer | 370/16 |
| 5,202,780 | 4/1993 | Fussganger | 359/125 |
| 5,285,305 | 2/1994 | Cohen et al. | 359/127 |
| 5,303,229 | 4/1994 | Withers et al. | 370/58.1 |
| 5,329,392 | 7/1994 | Cohen | 359/124 |
| 5,425,094 | 6/1995 | Noda | 379/292 |

FOREIGN PATENT DOCUMENTS 0238145   8/1986   Germany ................. 340/826

OTHER PUBLICATIONS

Varma et al., "Reduction of Crosspoints in One–Sided Crosspoint Switching Networks", Apr. 1989, *IEEE Infocom '89*, pp. 943–952.

*Primary Examiner*—Leo Boudreau
*Assistant Examiner*—Bhavesh Mehta
*Attorney, Agent, or Firm*—Baker & Botts

[57] ABSTRACT

A method and system to connect an optical network unit with a plurality of user sites. The invention includes the steps of and circuitry for connecting a plurality of line circuits to a cross-connect matrix. The optical network unit contains both the line circuits and the cross-connect matrix. In the invention, a plurality of drop connectors connect the cross-connect matrix to a plurality of user sites such as homes. The method and system further include circuitry that remotely controls the cross-connect matrix from a central office or network management system to connect selected ones of the line connectors to selected ones of the drop connectors and, thereby, electrically connect the optical network unit to the plurality of user sites.

15 Claims, 5 Drawing Sheets

METHOD AND SYSTEM FOR CONNECTING AN OPTICAL NETWORK UNIT WITH A PLURALITY OF USER SITES

TECHNICAL FIELD OF THE INVENTION

The present invention relates generally to electronics and more particularly electronic communications systems. Even more specifically, the invention relates to a method and system for connecting an optical network unit with a plurality of user sites that provides remote control features, improved system hardware characteristics, enhanced connection management features, and enhanced hardware protection properties.

BACKGROUND OF THE INVENTION

Fiber-in-the-loop (FITL) telecommunications systems use hundreds and thousands of optical network units (ONUs) to connect existing copper wire or twisted pair connections in homes and other user sites to the telephony network. Installation and maintenance of FITL systems typically require field technician on-site visits or service calls for functions such as adding second or additional lines, replacing failed line circuits, and cutting over new installations at each ONU. Field technician or craft service calls are generally labor intensive and expensive, and equipment handling by even the highest skilled field technicians can shorten the life expectancy of telecommunications equipment. Consequently, there is a need for alternative methods to perform the above-described operations.

The ONUs of an FITL system often are installed in hard-to-reach spots such as on poles, in hand holes, on cable strands, in muddy development sites, etc. They are sealed, and breaking their seal for routine functions will tend to reduce their reliability, introduce moisture and dirt, and require field technician time to reseal and re-verify the seal. Current system designs contemplate that ONUs will be deployed in great numbers (e.g., approximately 1 for every 8 homes or sites) compared with the higher numbers of sites that conventional communications remote terminals service. A failed circuit may require an immediate response to replace a line unit. This replacement or repair often occurs during off hours when labor rates are highest. If a field technician must go to each one of these sites to install connections, add second lines, or replace failed line circuits, system operating costs for FITL systems are likely to be substantially higher than similar costs for conventional systems. If a method and system existed that could save operating costs by allowing work to be scheduled during normal working hours, then such a method and system would be of great value to those companies responsible for maintaining and installing FITL telecommunications systems.

Another issue that FITL systems must address is system reliability. There is a need for a way to prevent having to break the ONU seals for the functions of installing connections, adding second lines, and replacing failed line circuits. A system meeting this need would eliminate line circuit failures from the reliability calculations as well as considerations for moisture and dirt that may enter an ONU as well as the requirement to reseal or re-verify seals for ONUs. As a result, FITL systems could more easily and simply meet design operating or reliability requirements and objectives.

It is an object of the present invention, therefore, to provide an ONU connection circuit that has technically advantageous hardware features to help extend the life and reliability of communication paths between a central office and a user site through the FITL system. The present invention accordingly avoids the need to open the ONU because the connections between the ONU line circuits and the user sites are remotely controlled. This improves the reliability of the telecommunications path, limits the amount of dust and moisture that may enter the ONU, and maintains the ONU seal. Without the need to re-verify the seal or to be concerned about dust and moisture entering the ONU, the present invention improves the reliability calculation for FITL systems.

Another object of the present invention is to provide a method and system for connecting an ONU with a plurality of user sites that include the steps of and circuitry for connecting a cross-connect matrix to a plurality of ONU line circuits. The method and system connect a plurality of drop connectors between the cross-connect matrix and a plurality of user sites or homes. The cross-connect matrix is remotely controllable to connect selected ones of the line circuits to selected ones of the drop connectors. This will connect the ONU with the plurality of user sites. As such, the method and system for connecting the ONU with the user sites can remotely add second lines, cutover new installations, and automatically bypass failed connectors more efficiently and economically than conventional methods of performing these functions.

An additional object is to take advantage of existing subsystems already present in a FITL ONU, including power, operations, communications, processor-based control, and environmental protection (both electrical and physical). These elements can be used by the present invention at no incremental cost—a significant advantage over a separate stand-alone metallic cross-connect.

Yet another objective of the present invention is to advantageously use the electronic circuitry associated with the ONU to immediately respond to line circuit testing that reports a failed line. Using the present invention, it is possible to automatically switch out a failed line upon electronic indication of its failure. This can eliminate a user having to report the FITL failed line and can improve overall FITL system operation, reliability, and user satisfaction.

It is yet a further object of the present invention to improve the management of connections between ONUs and user sites. Because the present invention provides remote control of user site-to-ONU connections, field technicians service trips can be minimized. Thus, hot cutover connections, and line circuit repair functions can occur in a well-managed way during regular normal working hours.

As yet a further object, the present invention provides an anti-sabotage feature for the optical network units. When service is to be denied on individual drops served by electronic line circuits, it is common practice to simply deactivate these circuits. Protection against malicious overvoltage from the deactivated drops requires physically disconnecting them, a labor intensive step, particularly in the case of FITL ONUs. The present invention automatically creates an open circuit between the user site and the ONU, so a would-be saboteur cannot induce from a user site an over-current condition in the communication connection to the ONU. Such an over-current condition could seriously damage electronic circuitry associated with the telecommunications line. This is a material distinction between the present invention and conventional systems.

BRIEF DESCRIPTION OF THE DRAWINGS

The invention and its modes of use and advantages are best understood by reference to the following description of illustrative embodiments when read in conjunction with the accompanying drawings wherein.

DETAILED DESCRIPTION OF THE INVENTION

The preferred embodiment of the present invention is best understood by referring to the FIGUREs, wherein like numerals are used for like and corresponding parts of the various drawings.

In general terms, the present invention uses an analog cross-connect matrix between a set of line circuit tips and rings and the drop tips and rings at the ONU protector panel. The ONU is located within and part of the fiber-in-the-loop (FITL) system. Connections can be remotely controlled from the network via the existing line circuit control path so that one or more line circuits may be switched in as needed for second line activation or for bypassing failed line circuits. The cross-connect is made optional by simply mounting the matrix on a small printed circuit board and inserting it electrically between the connectorized drop wiring harness and the ONU backplane drop connector. If it is omitted, there is no cost imposed other than the space that was allocated in the control connector on the ONU backplane. The circuit board may be mounted on the wall or door of the ONU. A small control cable connects the cross-connect to the line circuit control bus on the backplane for pulsing the cross-points to open and close them. To more completely explain how the present invention achieves its objects, the following discussion describes in more detail the solution in the preferred embodiment of a FITL application.

Figure 1:
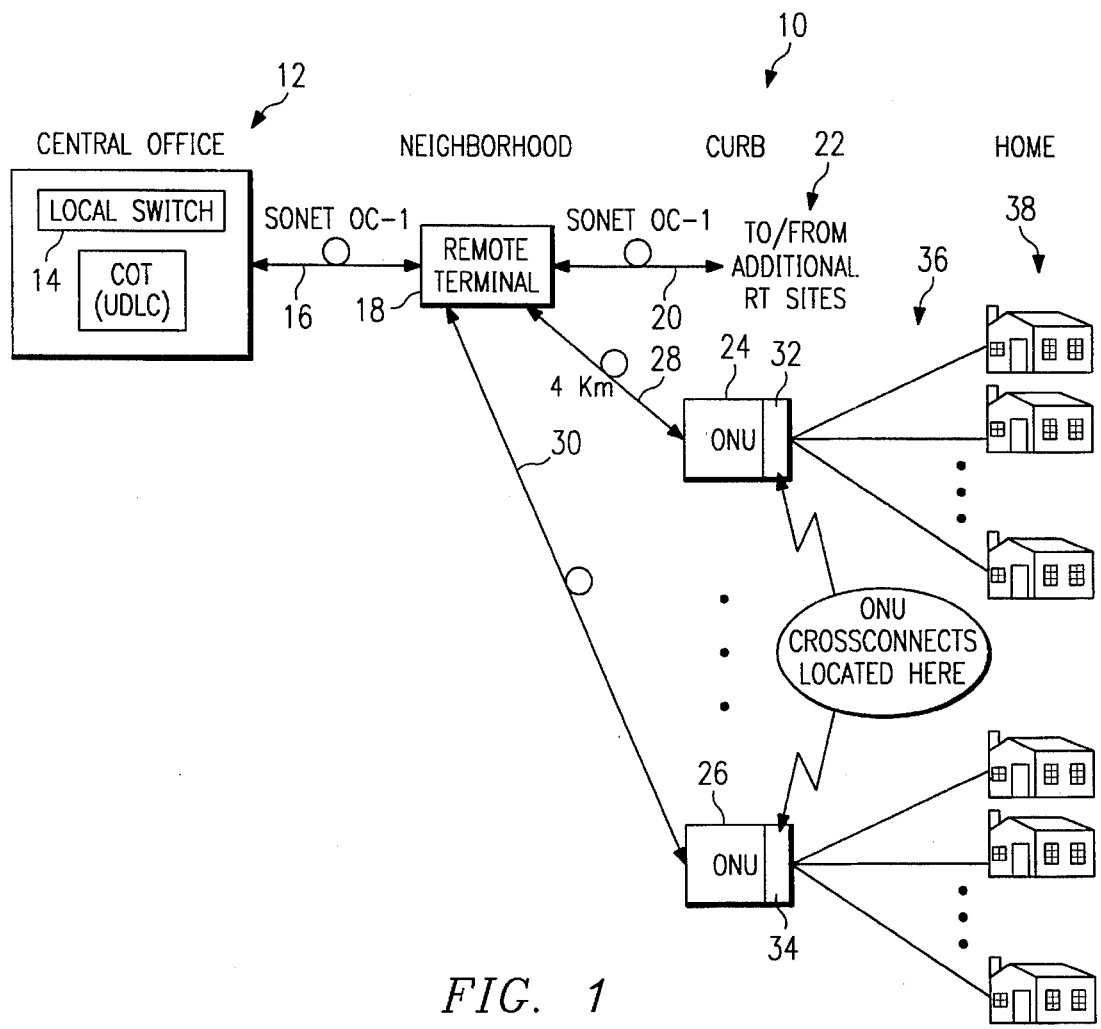
FIG. 1 provides a conceptual block diagram of an environment for using the preferred embodiment of the present invention.

In environment 10 of FIG. 1, central office 12 typically includes local switch 14. Optical cable 16 connects central office 12 to remote terminal 18. Remote terminal 18 is at the neighborhood level (i.e., there is typically one remote terminal to a neighborhood) and may connect through optical cable 20 to communicate with additional remote terminal sites as reference numeral 22 indicates. Each remote terminal drives optical connections to numerous ONUs as reference numerals 24 and 26 indicate through connection of associated optical cables 28 and 30, respectively. Within each ONU, ONU cross-connect circuitry of the preferred embodiment appears at chambers designated by reference numerals 32 and 34, for example. The ONU serves subscriber drops that are designated generally by reference numeral 36. Drops 36 connect to user sites or homes designated generally by reference numeral 38.

Figure 2:
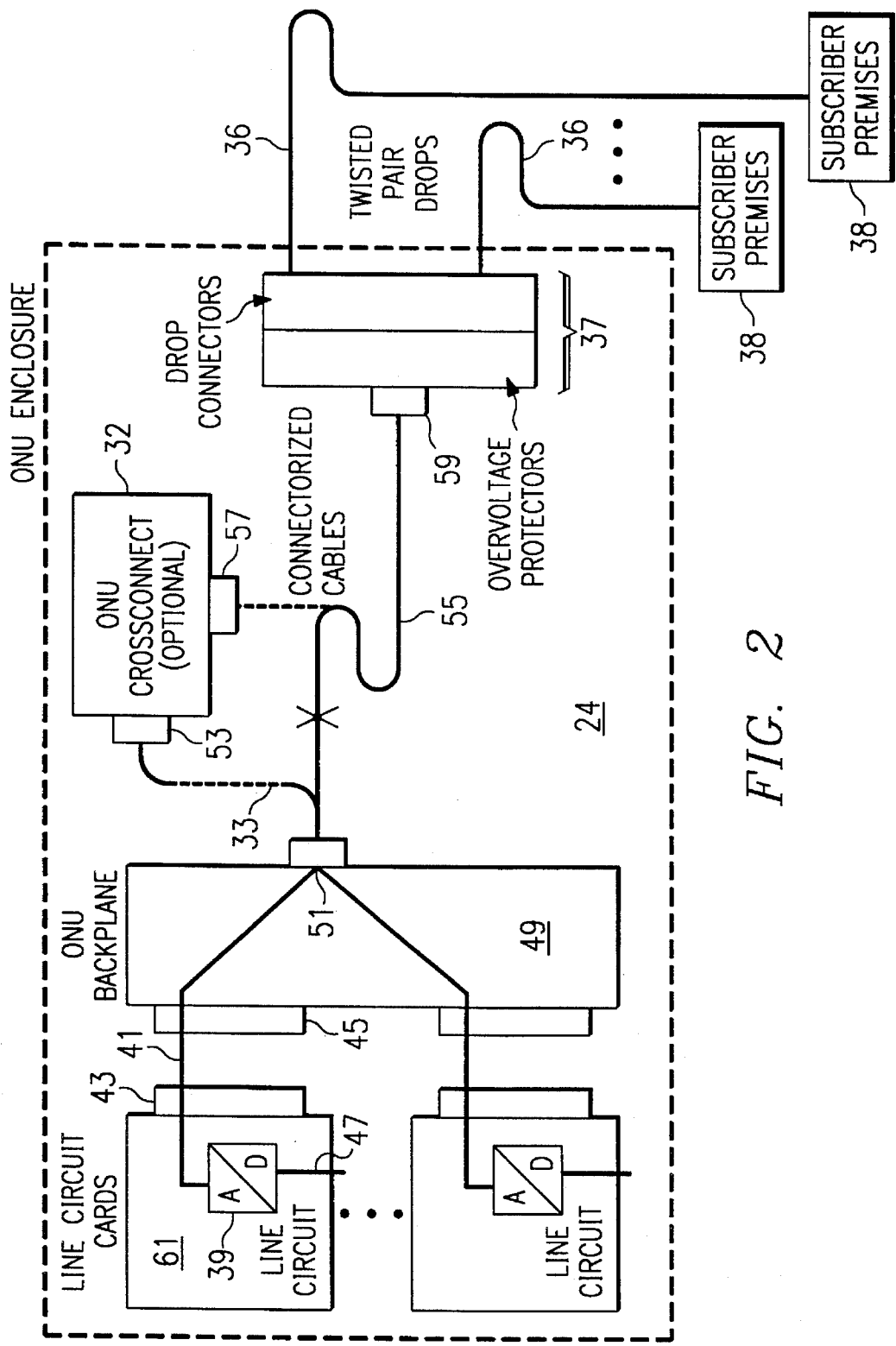
FIG. 2 provides a schematic block diagram of an ONU that implements the preferred embodiment.

In FIG. 2, ONU 24 is conceptually shown as an enclosure to illustrate how cross-connect matrix 32 may be implemented in an ONU. For example, line circuit cards 61 include line circuit analog-to-digital (A/D) converters 39 to which lines 41 connect. Lines 41 have connection points 43 and 45 that lead from line circuit cards 61 to ONU backplane 49. Lines 47 from A/D converters 39 go to multiplexer/demultiplexer elements enroute to and from the optical link to the remote terminal of the ONU. Within ONU backplane 49, lines 41 go to connection points 51. From connection points 51, lines 33 attach to connection points 53 where they lead into cross-connect matrix 32. From cross-connect matrix 32, lines 55 connect between connection points 57 and connection points 59 on the overvoltage protector/drop connector panel 37. Drop cables 36 connect overvoltage protector/drop connector panel 37 to subscriber premises 38. Thus, FIG. 2 illustrates that ONU 24 conveniently encloses cross-connect matrix 32. Taking advantage of the digital modulation and control circuitry that ONU 24 possesses, the present embodiment significantly reduces operation and maintenance costs of the FITL system.

Figure 3:
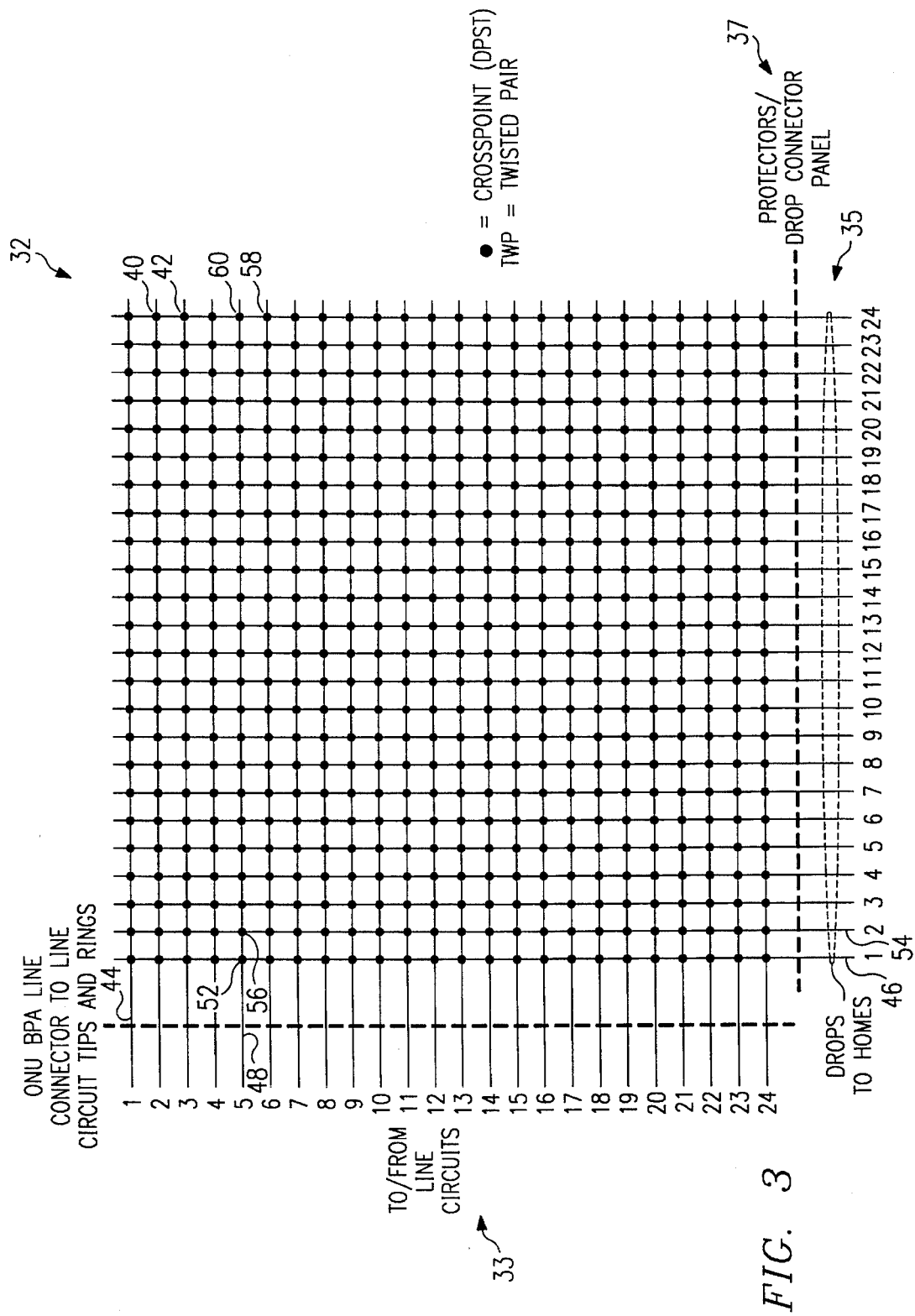
FIG. 3 conceptually illustrates one embodiment of the present invention.

Having explained the position and interconnection of ONU cross-connect 32, the following discussion describes its internal structure and functions. FIG. 3, therefore, illustrates one embodiment of ONU cross-connect circuitry 32 of the present invention in the form of a matrix that connects twenty-four line circuits 33 to twenty-four drops to homes 35 that permit;communications from the FITL system to user sites. In FIG. 3, cross points of matrix 32 are identified using a reference numeral such as 42, for example, to indicate where a line circuit tip-ring pair such as 44 (the pair for line circuit 1) may connect to a drop tip-ring pair 46 that goes to a home or other user site. As FIG. 3 illustrates, line circuit connections 1 through 24 may appear on the ONU backplane assembly (BPA) connector to line circuit tips and rings. The 24 drops to homes 35 may go to twenty-four or fewer homes, in this example. These drop connections will typically appear on a protector or connector panel.

In the configuration of FIG. 3, each line connector 1 through 24 may cross-connect to any drop connector 1 through 24 that goes to homes that the ONU serves. That is, for example, line connector 5 of reference numeral 48 may cross-connect to drop connector 1 having reference numeral 46 at cross point 52 or to drop connector 2 having reference numeral 54 at cross point 56, etc. Line connector 1, in fact, may cross-connect to any one of the drop connectors through closure of the appropriate cross point. Thus, as can be seen, each line circuit 1 through 24 can cross-connect to any drop 1 through 24.

Figure 4:
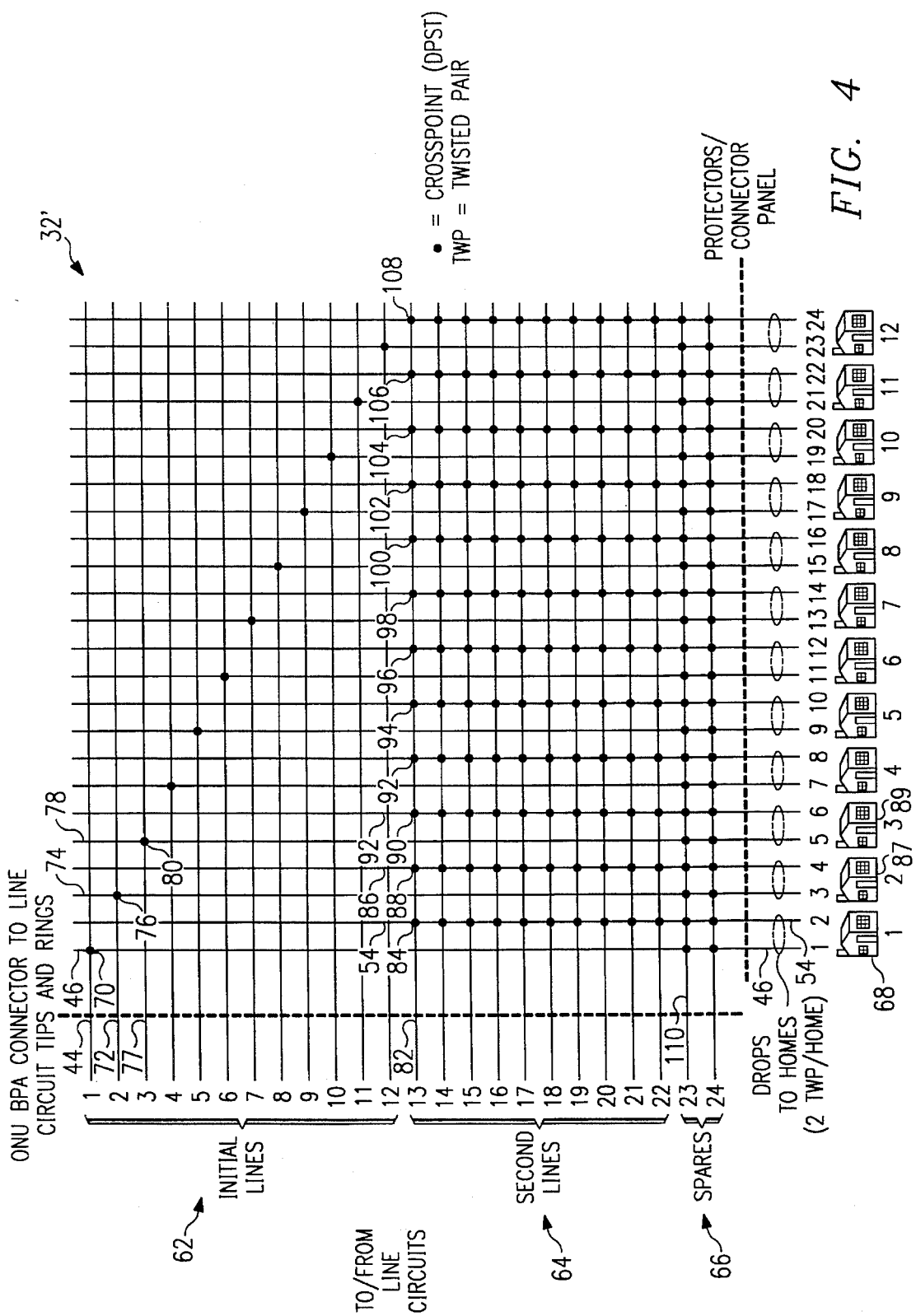
FIG. 4 illustrates yet another embodiment of the present invention.

The embodiment of FIG. 3, while providing the most flexibility, requires 576 (24×24) pairs of cross points and is, therefore, expensive to implement. A more economical configuration than that of FIG. 3 appears in the FIG. 4. In FIG. 4, cross-connect matrix 32' includes line connectors 1 through 24 that may cross-connect to drop connectors 1 through 24 with certain restrictions. In contrast to the totally flexible configuration of FIG. 3, the configuration 32' of FIG. 4 is less flexible but more cost effective and retains all the essential features of configuration 32. For example, cross-connect matrix 32' includes initial lines 62 that, in this example, use line connectors 1 through 12. Second lines 64 include line connectors 13 through 22 in this example. Furthermore, spare lines 66 include line connectors 23 and 24. Cross-connect matrix 32' of FIG. 4 allocates two of the twenty-four drop connectors to each of homes 1 through 12. For example, drop connector 1 at reference numeral 46 and drop connector 2 at reference numeral 54 connect to home number i at reference numeral 68. As is the case in the embodiment of FIG. 3, line connectors 1 through 24 may be installed as part of the ONU BPA connector to the line circuit tips and rings. The drop connectors to each of the homes 1 through 12 may be installed as part of the protector/connector panel at the ONU.

Cross-connect matrix 32' is more cost effective than is the cross-connect 32 configuration of FIG. 3, because initial lines 62 are allocated uniquely to homes 1 through 12. For example, line connector 1 at reference numeral 44 cross-connects only to drop connector 1 at reference numeral 46 using cross point 70. Line connector 2 at reference numeral 72 cross-connects only to drop connector 3 at reference numeral 74 using cross point 76. Furthermore, line connector 3 at reference numeral 77 cross-connects only to drop connector 5 at reference numeral 78 via cross point 80. Thus, each home of homes 1 through 12 has a unique one of initial lines 62 to which one of its two drop connectors connects in cross-connect matrix 32'. These cross points allow remote-controlled connection of initial lines during ONU installation, and disconnection of failed line circuits and out-of-service drops.

In addition, each home can be connected with one of second lines 64. For example, line connector 13, at reference numeral 82 may cross-connect with drop connector 2 at reference numeral 54 to service home 1 at reference numeral 68 via crosspoint 84. Line connector 13 at 82 may also cross-connect with drop connector 4 at reference numeral 86 via cross point 88 to service home 2 at reference numeral 87. Line connector 13 at 82 may, further, use cross point 90 to cross-connect with drop connector 6 having reference numeral 92 to service home 3 at 89, etc. Thus, each of the cross points 84, 88, 90, 93, 94, 96, 98, 100, 102, 104, 106 and 108 in this example permit line connector 13 at 82 to provide anyone of the homes 1 through 12 with a second line. This is the same situation for each of the line connectors 13 through 22, in this example, that serve as second lines 64.

Note that in this configuration only ten line connectors form second lines 64 to service any ten of the 12 homes. These numbers recognize that not all homes will require a second line. Therefore, it does not make economic sense to include a second line for all homes. The remaining two homes may be provided with second lines by spare line connectors 66, but this sacrifices their intended spare-line function. Cross-connect matrix 32' provides sufficient flexibility so that each of the second lines may service each of the homes 1 through 12.

Another characteristic of cross-connect matrix 32' of FIG. 4 is that it includes spare line connectors 66 formed from line connectors 23 and 24. FIG. 4 illustrates that line 23 at reference numeral 110 may cross-connect to any drop connector 1 through 24 to reach any home 1 through 12. The same is true for line connector 24. As such, if one or any two of initial lines 62 or second lines 64 fail, then one or two of spare lines 66 can cross-connect to drop connectors 1 through 24 to service homes 1 through 12 as either a spare initial line or a spare second line. Finally, either of spare line connectors 66 can provide a second line to the remaining two houses (beyond the 10 anticipated by the allocation of 10 line circuits to record lines 64), although such application precludes use of the same line circuit as a spare in case of line circuit failure.

Analog cross-connect matrix 32 connects line connectors 33 to drop connectors 35 at the ONU protector panel. Cross-connections may be remotely controlled via the existing line circuit control path (for example, the inter-processor control channel and the Line Unit Interface Bus (LUIB) in the specific case of the Alcatel Network System, Inc.'s 1501/FTC product) so one or more spare line connectors 33 may be switched in as needed for second line activation or bypassing failed line circuits.

Cross-connect matrix 32 or 32' is made optional by simply mounting it on a small printed board assembly and inserting it electrically between the connectorized drop wiring harness and the ONU drop connector. If it is omitted, there is no cost imposed other than the space that was allocated and the control connector on the ONU BPA. The printed board assembly may be mounted on the wall or door of the ONU. A small control cable may connect cross-connect matrix 32 or 32' to the LUIB or ONU controller/processor bus on the backplane for commands to pulse the latching cross points.

As can be seen in the cross-connect circuitry 32' there is significant flexibility over existing connection methods and systems for connecting a FITL system to user sites. As a practical matter, while cross-connect matrix 32' may not have the full connectivity of cross-connect matrix 32 of FIG. 3, there is substantial flexibility in cross-connect 32' and all essential features are maintained. Additionally, because cross-connect matrix 32' only requires 180 cross points, substantial savings result in its implementation.

In summary, therefore, the connection of the preferred embodiment includes cross-connect matrix 32 or 32' sized according to the degree of flexibility required. In FIG. 3, the complete connect-any-line-connector-to-any-drop-connector implementation appears. This complete embodiment may be considered unnecessary for the intended functions provided and requires 576 cross points. The implementation of FIG. 4, on the other hand, provides all four functions of adding second lines, bypassing failed line circuits, physically disconnecting (vandal-proofing) out-of-service lines, and cutting over installations, with a significantly reduced set of cross points at about one-third the total cost of the FIG. 3 implementation. This particular arrangement shows 12 initial lines 62 as the installed base to twelve homes. Up to ten line circuits may serve as second lines 64 to any of the twelve homes. The last two line circuits are designated spares lines 66 for bypass of failed line circuits, but they may also serve as second lines if so desired. The line circuits for second line and spare use also may be partially unequipped to the extent desired by the operating company, thus saving considerable equipment expense.

Combinations of cross point connections other than those appearing in FIGS. 3 and 4 are possible and within the scope of the present invention. For example, twelve cross points could be saved by having only one spare line circuit and thirteen, instead of twelve, second line circuits.

Figure 5:
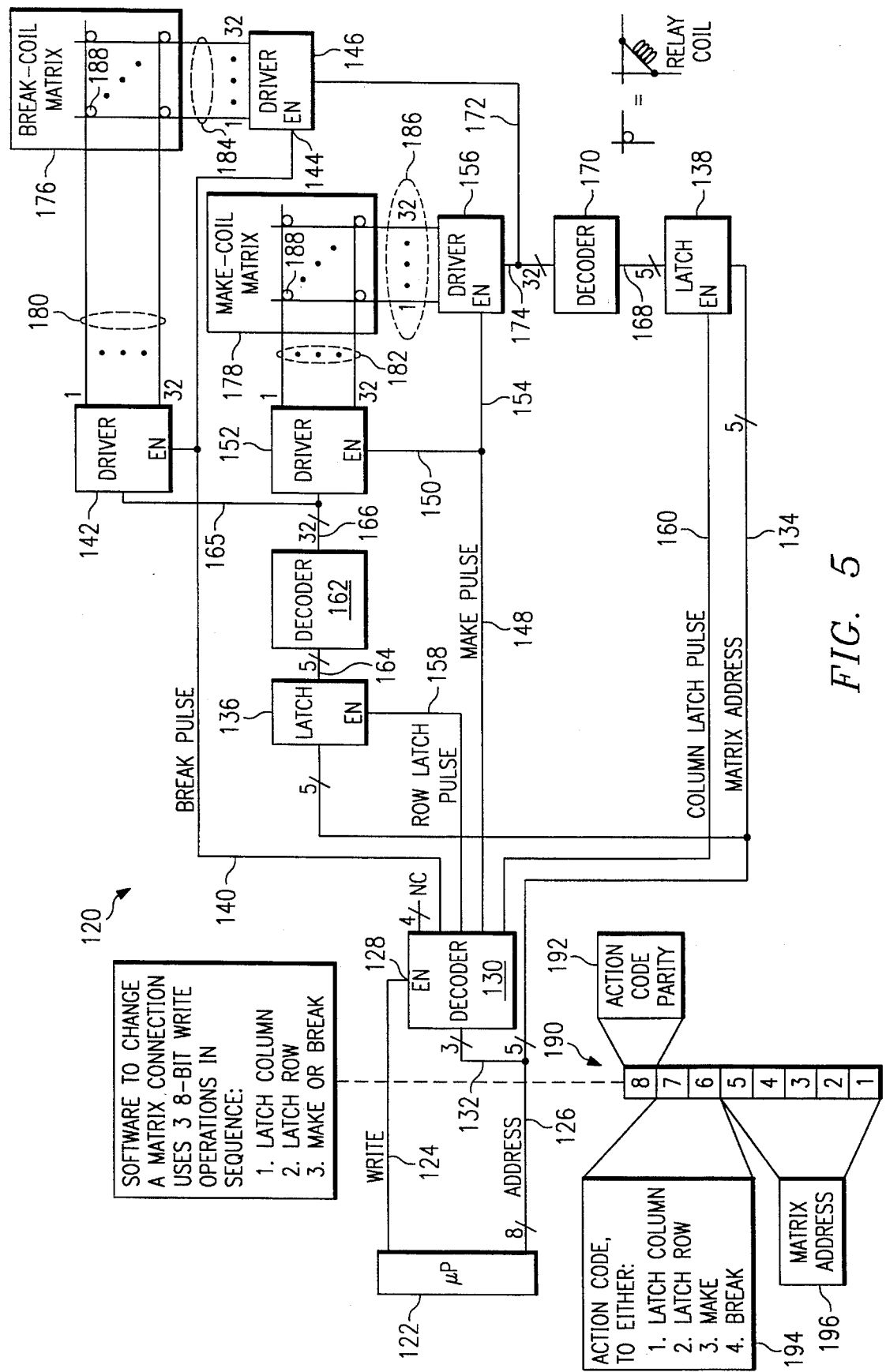
FIG. 5 illustrates control circuitry of the preferred embodiment of the present invention.

In FIG. 5, an example of a circuit logic diagram that can control a cross-connect matrix such as cross-connect matrix 32 of FIG. 3 or cross-connect matrix 32' of FIG. 4 appears. Suppose, however, for the following discussion that the circuit of FIG. 5 operates on cross-connect of FIG. 3 matrix 32. Circuit logic diagram 120 of FIG. 5 assumes latching cross points with separate make and break coils, and includes microprocessor 122 that executes the software to change a matrix connection using three, 8-bit WRITE operations in sequence. The three WRITE operations include: latch a column, latch a row (to address a specific cross point of cross-connect matrix 32) and MAKE or BREAK a connection to close or open the addressed cross point connection. Leading from microprocessor 122 are WRITE bit line 124 and eight ADDRESS bit lines 126. WRITE bit line 124 goes to enable input 128 of decoder 130. Three ADDRESS bit lines 132 also input to decoder 130. The remaining five ADDRESS bit lines 134 connect parallel to latch 136 and latch 138.

From decoder 130, line 140 provides a BREAK pulse to the ENABLE inputs of drivers 142 and 146. MAKE pulse line 148 provides an ENABLE signal 150 to driver 152, and an ENABLE signal 154 to driver 156. ROW LATCH pulse line 158 connects to and provides an ENABLE signal to latch 136. COLUMN LATCH pulse line 160 provides an ENABLE bit to latch 138. Latch 136 provides a ROW input to decoder 162 through five bit lines 164. From decoder 162, 32 bit lines go in parallel to driver 142 and driver 152 via bit lines 165 and bit lines 166, respectively. From latch 138, five bit lines 168 connect to decoder 170. From decoder 170, 32 bit lines go in parallel to driver 146 and driver 156 via bit lines 172 and bit lines 174, respectively. Therefore, drivers 142 and 152 provide ROW select signals to BREAK-COIL matrix 176 and MAKE-COIL matrix 178 via lines 180 and lines 182, respectively. Also, driver 146 and driver 156 provide column select signals to BREAK-COIL matrix 176 and MAKE-COIL matrix 178 via lines 184 and lines 186, respectively.

In both BREAK-COIL matrix 176 and MAKE-COIL matrix 178, relay coils 188 control the relays that contains the cross points, such as cross point 70 of FIG. 4 to connect line circuits such as line circuit 1 to drop connectors such as drop connector 46 to service the user's site or home 68. To save power, latching cross points should be used. Discrete latching relays can be used, but they can be unlatched by mechanical impact. Therefore, if discrete latching relays 188 are used, they should be periodically reset as a microprocessor 122 background task. Known relays take up about 1/6th of a square inch in board space. More compact, economical analog matrices, instead of discrete relays, may be used, therefore, for volume production. Latching cross points eliminate any need to increase ONU power supply capacity, since the connection making and breaking operations require only short infrequent pulses.

In operation, the column and row addresses for a particular cross point pair are latched. Then, when a BREAK pulse appears on line 140 an ENABLE signal goes simultaneously to driver 142 and driver 146 to drive BREAK-COIL matrix 176 according to the ADDRESS latched previously from matrix ADDRESS bit lines 134 disconnecting the selected cross point pair. Likewise, when a MAKE pulse appears on line 148, an ENABLE signal goes to driver 152 and driver 156 to energize MAKE-COIL matrix 178, thus connecting the appropriate-cross point as designated by matrix ADDRESS latched previously from bit lines 134.

Also for illustrative purposes, FIG. 5 includes 8-bit word 190 that microprocessor 122 provides to decoder 130. Eight-bit word 190 provides, for example, action code parity bit 192 at bit position 8. At bit positions 6 and 7, action codes 194 appear to either (1) latch a column of BREAK-COIL matrix 176 or MAKE-COIL matrix 178, (2) latch a row of BREAK-COIL matrix 176 or MAKE-COIL matrix 178, (3) pulse MAKE-COIL matrix 178, or (4) pulse BREAK-COIL matrix 176. In bit positions 1 through 5 appear matrix ADDRESS bits 196. Thus, for both MAKE-COIL matrix 178 and BREAK-COIL matrix 176, matrix ADDRESS bits 196 specify the specific relay coil or coils 188 that the circuit 120 is to operate.

Applicable standards should be applied to the detailed unit and system design for the present invention. For example, BELLCORE Technical Advisory TA-NPL-000407 proposes requirements for metallic automated cross-connect systems. Also, to prevent silent failures, the drop test for cross-connect matrix 32 or 32' should include detection of protector components to distinguish bad (open) cross points from "no ringers present" (a typical drop test result when a drop is open, or no telephones are present in user premises).

The preferred embodiment, provides, for little additional cost, a significant reduction in operating costs as well as additional features. These features include reducing second line addition, failed line circuit by-pass, and new line installation response times. Using the preferred embodiment, a second line may be instantly cut in to a home without the requirement of a field technician visit. Thus, additional lines may be offered to users on a pay-as-you-go option. Similarly, remote control of cross-connect matrix 32 or cross-connect matrix 32' permits immediate and automatic failed line circuit by-pass, as well as making new connections to user sites during system installation.

The preferred embodiment improves reliability of the FITL system to the extent that line circuit failures are removed from FITL system reliability calculations. Another technical advantage of the preferred embodiment is the ability to provide vandal-proof service cutoff. Since cross-connect matrix 32 of FIGS. 3 and cross-connect matrix 32' of FIG. 4 physically disconnect line circuits from drop connectors, a disgruntled former subscriber cannot induce an over-current or voltage-spike condition that would cause damage to the ONU or other adjacent lines.

OPERATION

The operation, as a whole, of the preferred embodiment may be best understood by referring first to FIGS. 1 and 4. Suppose that the network manager of central office 12 desires to connect home 168 to line circuit 1 of ONU 24. By sending a network management command through optical cable 16 to remote terminal 18, the signal can flow through optical cable 28 to associated ONU 24. At ONU (24), the control logic of the preferred embodiment that FIG. 5 describes can be actuated to connect home 1 to line circuit 1. For example, further assume that the command from central office 12 to ONU 24 is to connect home number 1 of FIG. 4 to line circuit 1 of FIG. 4. This command is received by microprocessor 122, causing it to generate the three 8-bit write signals to latch column #1, latch row #1, and pulse the MAKE coil of the first latching cross point.

The matrix address for the cross point appears in matrix ADDRESS bits 1 through 5, as reference 196 illustrates. Three bits 132 of this address are sent to decoder 130 which also receives the WRITE ENABLE bit at 128. The five other matrix ADDRESS bits 196 are sent along matrix bit lines 134 to latches 136 and 138 enroute to MAKE-COIL matrix 178. From decoder 130, the appropriate LATCH COLUMN and LATCH ROW pulses flow via ROW-LATCH pulse bit line 158 and COLUMN LATCH pulse bit line 160, respectively, to ROW LATCH 136 and COLUMN LATCH 138. Then, based on the address that corresponds to the cross point 70 of line connector 1 with drop connector 46, in this example, the associated relay coil 188 will close to make a connection of line connector 1 to drop connector 46 and place home number 1 at reference numeral 68 in communication with ONU 24, for example. Operations similar to these may occur for the purposes of adding second lines, cutting over a complete new installation, as well as for bypassing failed line circuits using a configuration of cross-connect matrix 32 of FIG. 3, or cross-connect matrix 32' of FIG. 4.

The preferred embodiment of the invention also provides a low-cost, compact system that resides in the ONU. Thus, it takes advantage of several pre-existing ONU capabilities at no additional cost, including, for example, the following: control communications, power, overvoltage protection, and environmental protection (through use of the sealed ONU enclosure). The system uses existing line circuit control paths and avoids the need to open the ONU for establishing communication between ONU and user sites. Avoiding the need to open the ONU increases the ONU's reliability, keeps dust and moisture out of the ONU enclosure, and eliminates the need to re-verify the ONU seal. With the addition of testing circuitry, the preferred embodiment may be used as an intelligent system that tests the existence of a problem or failure in a drop or line circuit. Upon sensing a problem, the cross-connect system can change cross-connections between drops and line circuits automatically. This may be done without the need for user intervention or a user call to the central office.

The preferred embodiment provides other connection management features. It not only avoids the field technician service trips to ONU for the above functions, but it also avoids problems associated with making a hot cutover by electronically switching connections between drop tips and rings and line circuit tips and rings in establishing a desired telecommunications path.

Another technical advantage of the present invention is that it provides rapid response to problem conditions because it eliminates the need to physically locate and correct problems in the ONU itself. The result is a significant reduction in system operating costs and even elimination of line circuits from reliability calculations of the FITL system. The preferred embodiment allows a network manager to more carefully and deliberately plan the maintenance of an FITL system because it permits immediate connection between an unused line circuit and the drop to a home.

In summary, therefore, there is provided a method and system for connecting an optical network unit with a plurality of user sites that include the steps of and circuitry for connecting a plurality of line circuits and subscriber drops by a cross-connect matrix in an optical network unit. With these connections to the cross-connect matrix, the preferred embodiment provides the ability to remotely control the cross-connect matrix to connect selected ones of the line circuits to selected ones of the subscriber drops to connect the optical network unit to the plurality of user sites.

Although the invention has been described with reference to the above-described embodiments, this description is not meant to be construed in a limiting sense. Various modifications of the disclosed embodiment, as well as alternative embodiments of the invention, will become apparent to persons skilled in the art upon reference to the above description. It is, therefore, contemplated that the appendant claims will cover such modifications that fall within the true scope of the invention.

What is claimed is:

1. A method for connecting an optical network unit with a plurality of user sites, comprising the steps of:

connecting a cross-connect matrix with a plurality of line circuits of an optical network unit;

connecting a plurality of drop connectors between the cross-connect matrix and a plurality of user sites, wherein each of a first set of line circuits is cross-point connectable only to a corresponding one of a first set of drop connectors and each of a second set of line circuits is cross-point connectable to more than one of a second set of drop connectors; and controlling the cross-connect matrix to connect selected ones of the line circuits with selected ones of the drop connectors to associate the optical network unit with the plurality of user sites.

2. A cross-connect circuit for connecting an optical network unit with a plurality of user sites, comprising:

a cross-connect matrix within the optical network unit and comprising a plurality of cross points;

a plurality of line circuits within the optical network unit for connecting to said cross-connect matrix;

a plurality of drop connectors for connecting between said cross-connect matrix and a plurality of user sites, wherein each of a first set of line circuits is cross-point connectable only to a corresponding one of a first set of drop connectors and each of a second set of line circuits is cross-point connectable to more than one of a second set of drop connectors; and means to control the cross-connect matrix to connect selected ones of the line circuits with selected ones of the drop connectors to associate the optical network unit with the plurality of user sites.

3. A system for communicating between a central office and a plurality of user sites, comprising:

a remote terminal for connecting to the central office;

an optical network unit for connecting to said remote terminal;

a cross-connect matrix within said optical network unit and comprising a plurality of cross points;

a plurality of line circuits within said optical network unit for connecting to said cross-connect matrix;

a plurality of drop connectors between said plurality of cross points and a plurality of user sites for connecting said cross-connect matrix with said plurality of user sites, wherein each of a first set of line circuits is cross-point connectable only to a corresponding one of a first set of drop connectors and each of a second set of line circuits is cross-point connectable to more than one of a second set of drop connectors; and control circuitry for controlling said cross points to connect selected ones of said line circuits with selected ones of said drop connectors for associating said optical network unit with said plurality of user sites.

4. A method for connecting an optical network unit with a plurality of user sites, comprising the steps of:

connecting a plurality of line circuits with a cross-connect matrix;

connecting a plurality of drop connectors between the cross-connect matrix and the plurality of user sites, wherein each of a first set of line circuits is cross-point connectable only to a corresponding one of a first set of drop connectors and each of a second set of line circuits is cross-point connectable to more than one of a second set of drop connectors; and remotely controlling said matrix from a central office to connect selected ones of the line connectors with selected ones of the drop connectors to establish a communication path between the optical network unit and the plurality of user sites.

5. A cross-connect circuit for connecting an optical network unit with a plurality of user sites, comprising:

circuitry for connecting a plurality of line circuits of an optical network unit with a cross-connect matrix;

circuitry for connecting a plurality of drop connectors between the cross-connect matrix and the plurality of user sites, wherein each of a first set of line circuits is cross-point connectable only to a corresponding one of a first set of drop connectors and each of a second set of line circuits is cross-point connectable to more than one of a second set of drop connectors; and remote control circuitry associated with the cross-connect matrix connecting selected ones of the line circuits with selected ones of the drop connectors to establish a communication path between the optical network unit and the selected user sites from a central office.

6. A method for connecting an optical network unit with a plurality of user sites while maintaining a protective seal enclosing the optical network unit, comprising the steps of:

connecting within a protective seal a plurality of line circuits of an optical network unit with a cross-connect matrix;

connecting a plurality of drop connectors within the protective seal between the cross-connect matrix and the plurality of user sites, wherein each of a first set of line circuits is cross-point connectable only to a corresponding one of a first set of drop connectors and each of a second set of line circuits is cross-point connectable to more than one of a second set of drop connectors; and controlling the cross-connect matrix while maintaining the protective seal to connect selected ones of the line circuits with selected ones of the drop connectors to connect the optical network unit with the plurality of user sites.

7. A communication circuit for connecting an optical network unit with a plurality of user sites, comprising:

an optical network unit comprising a protective seal for preventing contamination of circuitry within said optical network unit;

a cross-connect matrix comprising a plurality of cross points;

a plurality of line circuits within said optical network unit for connecting to said cross points;

a plurality of drop connectors for connecting said cross points to a plurality of user sites within said protective seal, wherein each of a first set of line circuits is cross-point connectable only to a corresponding one of a first set of drop connectors and each of a second set of line circuits is cross-point connectable to more than one of a second set of drop connectors; and control circuitry for controlling said cross points to connect selected ones of the line circuits with selected ones of the drop connectors within said protective seal to, thereby, connect said optical network unit with said plurality of user sites.

8. A method for remotely adding a second line connection between an optical network unit of a fiber-in-the-loop system to a selected user site, including a cross-connect matrix having a connection between a first line circuit and a first drop connector that establishes a connection between a selected user site and the optical network unit, said first line circuit being connectable only to said first drop connectors the method comprising the steps of:

connecting a second line circuit with the cross-connect matrix;

connecting a second drop connector between the cross-connect matrix and the selected user site, said drop connector being additional to and separate from the first drop connector; and remotely controlling the cross-connect matrix to connect the second line circuit with the second drop connector to form a second line connection between the user selected site and the optical network unit.

9. The method of claim 8, further comprising the step of selecting the second line circuit from a plurality of second line circuits where each of the plurality of second line circuits is connectable to the second drop connector.

10. A cross-connect circuit for remotely adding a second line connection between an optical network unit of a fiber-in-the-loop system to a selected user site, comprising:

a cross-connect matrix comprising a plurality of cross points;

a first line circuit within an optical network unit for connecting to a first cross point;

a first drop connector for connecting said first cross point to a selected user site, said first line circuit connectable only to said first drop connector;

a second line circuit for connecting to a second cross point;

a second drop connector for connecting said second cross point to said selected user site, said second drop connector being additional to and separate from said first drop connector; and remote control circuitry for controlling said second cross point for connecting said second line circuit with said second drop connector to form a second line connection between said selected user site and said optical network unit.

11. The cross-connect circuit of claim 10, wherein said second line circuit is selected from a plurality of second line circuits and further wherein each of said plurality of second line circuits is connectable to said second drop connector through said cross-connect matrix.

12. A method for remotely by-passing a failed line circuit between a user site and an optical network unit, comprising the steps of:

identifying a failed line circuit serving a user site from within an optical network unit, the failed line circuit being connected through a cross-connect matrix to a drop connector, the drop connector connecting between the cross-connect matrix and the user site, wherein each of a first set of line circuits is cross-point connectable only to a corresponding one of a first set of drop connectors and each of a second set of line circuits is cross-point connectable to more than one of a second set of drop connectors;

connecting a spare line circuit within the optical network unit to the cross-connect matrix;

remotely controlling the cross-connect matrix to disconnect the failed line circuit from the drop connector and connect the spare line connector with the drop connector to by-pass the failed line connector and, thereby, restore service to the user site from the optical network unit.

13. A cross-connect circuit for remotely by-passing a failed line circuit serving a user site from within an optical network unit, comprising:

a cross-connect matrix comprising a plurality of cross points, said cross points for connecting a plurality of line circuits with a plurality of drop connectors, wherein each of a first set of line circuits is cross-point connectable only to a corresponding one of a first set of drop connectors and each of a second set of line circuits is cross-point connectable to more than one of a second set of drop connectors;

means for identifying a failed line circuit serving a user site from within an optical network unit, said failed line circuit being connected through said cross-connect matrix with a drop connector, said drop connector being connected between said cross-connect matrix and the user site;

a spare line circuit within said optical network unit for connecting to said cross-connect matrix;

remote control circuitry for controlling said cross-connect matrix to disconnect the failed line circuit from said drop connector and connect said spare line circuit with said drop connector to by-pass the failed line circuit and, thereby, restore service to the user site from within the optical network unit.

14. A method for preventing sabotage of an optical network unit from a user site, comprising the steps of:

connecting a plurality of line circuits of an optical network unit with a cross-connect matrix;

connecting a plurality of drop connectors between the cross-connect matrix and the plurality of user sites, wherein each of a first set of line circuits is cross-point connectable only to a corresponding one of a first set of drop connectors and each of a second set of line circuits is cross-point connectable to more than one of a second set of drop connectors; and controlling the cross-connect matrix to connect selected ones of the line circuits with selected ones of the drop connectors to establish a communication path between the optical network unit with the selected user sites; and controlling the cross-connect matrix to disconnect selected ones of the drop connectors from the plurality of line circuits to prevent an applied voltage on said selected ones of the drop connectors from affecting any of the line circuits and the optical network unit.

15. A cross-connect circuit for preventing sabotage of an optical network unit from a user site, comprising the steps of:

a cross-connect matrix comprising a plurality of cross points;

a plurality of line circuits within the optical network unit for connecting to said cross points;

a plurality of drop connectors for connecting said cross points to a plurality of user sites, wherein each of a first set of line circuits is cross-point connectable only to a corresponding one of a first set of drop connectors and each of a second set of line circuits is cross-point connectable to more than one of a second set of drop connectors; and control circuitry for controlling said cross-connect matrix to connect selected ones of the line circuits with selected ones of the drop connectors; and said control circuitry further for controlling said cross-connect matrix to disconnect selected ones of said plurality of drop connectors from said plurality of line circuits to prevent a voltage applied to one of said plurality of drop connectors from affecting any of the line connectors or the optical network unit.

* * * * *